(12) United States Patent
Perkins, Jr. et al.

(10) Patent No.: US 6,513,743 B1
(45) Date of Patent: Feb. 4, 2003

(54) ANTI-REVERSE LARGE ARBOR FLY REEL

(75) Inventors: Leigh H. Perkins, Jr., Manchester Center, VT (US); James B. Lepage, Manchester Center, VT (US)

(73) Assignee: The Orvis Company, Inc., Manchester, VT (US)

(*) Notice: Subject to any disclaimer, the term of this patent is extended or adjusted under 35 U.S.C. 154(b) by 0 days.

(21) Appl. No.: 09/877,749

(22) Filed: Jun. 11, 2001

(51) Int. Cl.[7] ..................... A01K 89/016; A01K 89/033
(52) U.S. Cl. ............... 242/295; 242/303; 242/317; 242/264
(58) Field of Search ............... 242/332, 303, 242/317, 295, 270, 271, 261

(56) References Cited

U.S. PATENT DOCUMENTS

| | | | |
|---|---|---|---|
| 3,315,913 A | * 4/1967 | Grieten | 242/271 |
| 3,478,977 A | * 11/1969 | Sarah | 242/270 |
| 4,056,246 A | * 11/1977 | Purcell | 242/270 |
| 4,162,049 A | 7/1979 | Stutz et al. | |
| 4,278,217 A | * 7/1981 | Blackwell | 242/264 |
| 4,742,974 A | * 5/1988 | Furomoto | 242/271 |
| 4,958,785 A | * 9/1990 | Aoki | 242/295 |
| 5,035,374 A | * 7/1991 | Kaneko | 242/264 |
| 5,064,139 A | * 11/1991 | Toda | 242/317 |
| 5,297,756 A | * 3/1994 | Ikuta | 242/270 |
| 5,318,246 A | * 6/1994 | Ikuta | 242/303 |
| 5,556,049 A | * 9/1996 | Bennett et al. | 242/303 |
| 5,601,246 A | 2/1997 | Takahashi | |
| 5,626,303 A | * 5/1997 | Bringsen | 242/317 |
| 5,639,038 A | 6/1997 | Hirose | |
| 5,775,614 A | 7/1998 | Yamaguchi | |
| 5,850,979 A | 12/1998 | Murayama et al. | |
| 5,855,330 A | 1/1999 | Kobayashi | |
| 5,901,913 A | 5/1999 | Yamaguchi et al. | |
| 5,921,492 A | * 7/1999 | Bauer | 242/317 |
| 5,996,919 A | 12/1999 | Murayama et al. | |
| 6,003,801 A | 12/1999 | Kobayashi et al. | |
| 6,032,894 A | 3/2000 | Chapman et al. | |
| 6,036,130 A | 3/2000 | Tietjen | |
| 6,042,037 A | 3/2000 | Nanbu | |
| 6,047,913 A | 4/2000 | Yamaguchi et al. | |
| 6,065,699 A | 5/2000 | Sacconi | |
| 6,095,444 A | 8/2000 | Miyazaki | |
| 6,098,908 A | 8/2000 | Ng | |
| 6,102,316 A | 8/2000 | Nilsen | |
| 6,105,891 A | 8/2000 | Ikuta et al. | |
| 6,126,103 A | 10/2000 | Nanbu | |
| 6,155,508 A | 12/2000 | Lepage | |
| 6,209,815 B1 | * 4/2001 | Collier | 242/317 |
| 6,286,772 B1 | * 9/2001 | Koelewyn | 242/295 |
| 6,402,073 B1 | * 6/2002 | Datcuk | 242/270 |

FOREIGN PATENT DOCUMENTS

| JP | 04349837 A | * 12/1992 | 242/303 |
|---|---|---|---|

OTHER PUBLICATIONS

Tiagra 130—http://www.shimano.com/fishing/conventional/index.html printed Jan. 15, 2001.
Selected pages from the Feather–Craft catalog.
*Fly Rod & Reel Magazine*, Jun. 200,1 cover page and p. 56, 57.
Web page describing Steel Fin Vario Reels.

* cited by examiner

*Primary Examiner*—Kathy Matecki
*Assistant Examiner*—Sang Kim
(74) *Attorney, Agent, or Firm*—Fay, Sharpe, Fagan, Minnich & McKee

(57) ABSTRACT

An anti-reverse large arbor fly fishing reel is provided which is robust in design and has a superior drag. The reel includes a drag offset structure allowing an angler to switch between a preset light drag to a preset heavy drag while still allowing full adjustability of drag force.

27 Claims, 7 Drawing Sheets

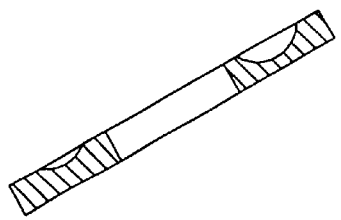
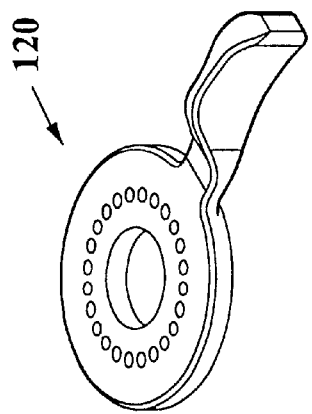
FIG. 5C
FIG. 5
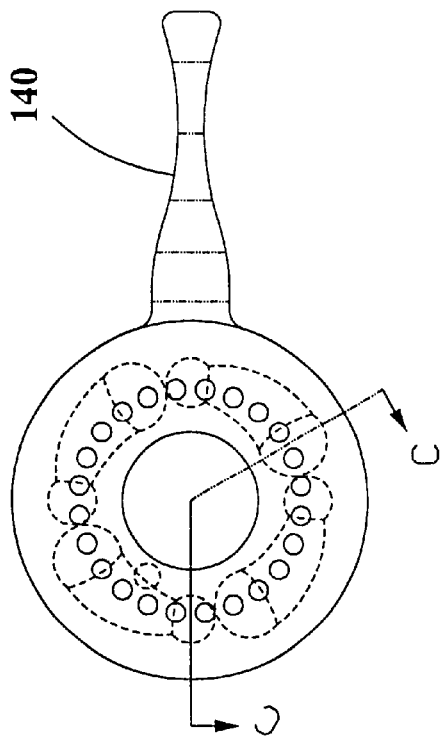
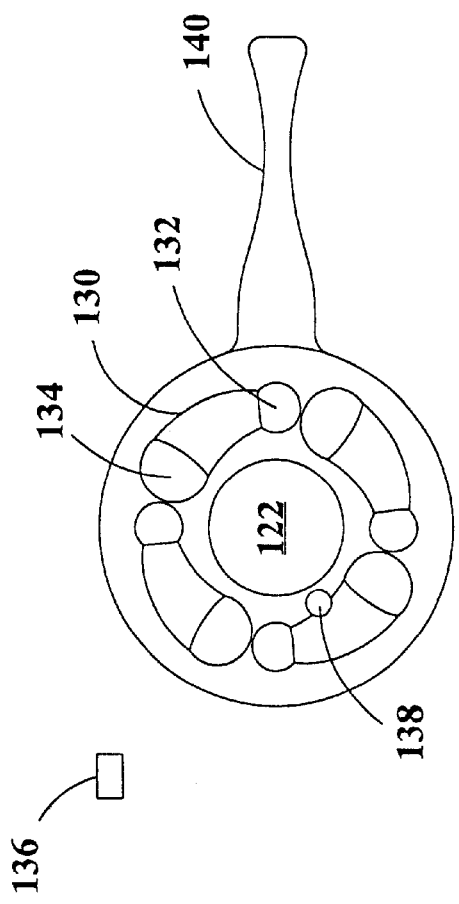
FIG. 5B
FIG. 5A

ANTI-REVERSE LARGE ARBOR FLY REEL

FIELD OF THE INVENTION

The present invention pertains to the art of fishing reels and more particularly to a large arbor anti-reverse fly fishing reel having a drag which is adjustable on the side of the reel opposite the handle.

BACKGROUND OF THE INVENTION

Fly fishing is a sport in which an angler uses a fishing rod, reel and line to present a fly to a fish in hopes of catching the fish. In fly fishing, the flies, or artificial lures, are frequently very light and feathery. The angler therefore casts the line which carries the fly to the desired location. The quantity of line is sometimes taken off the reel by the angler and paid out during casting to achieve the desired result.

The elements recited above, a fly fishing rod, a fly fishing reel, a fly fishing line, and a fly all come in a large variety of types from various organizations. Lighter equipment is often used in fresh water environments when an angler is pursuing smaller varieties of fish. Larger, more robust equipment is often used when one is pursuing large saltwater fish. Different types of rods and reels are also available as anglers have different tastes and desire different types of equipment even when it pursuing the same quarry.

The present invention is an anti-reverse large arbor fly fishing reel and particularly a fly fishing reel having attributes useful in pursuing large saltwater species.

Large arbor fly fishing reels have found favor in the last several years particularly in the saltwater environment. Large arbor reels store line in larger coils resulting in a line more likely to cast and lay down straight rather than in a helical form due to the memory of being coiled on a tight small arbor reel. One successful large arbor reel is described in U.S. Pat. No. 6,155,508 assigned to the same assignee as the present invention. That large arbor reel provides a reel with easily replaceable spools having a large area drag adjustable with a drag knob. The handle for turning the spool is mounted directly on the spool and the drag knob is on the side of the reel opposite the spool knob. U.S. Pat. No. 6,155,508 to Lepage entitled "Large Arbor Fly Fishing Reel" is incorporated herein by reference.

Another successful saltwater fly fishing reel is offered by The Orvis Company of Manchester, Vt. under the trademark DXR. That reel is an anti-reverse reel. The handle used to turn the spool on a DXR brand reel is not attached directly to the spool. Rather, it acts through an anti-reverse mechanism. The handle will only rotate in the "line in" direction. When line is being paid out as when a fish is running away from the angler at high speed, the handle does not rotate. With an anti-reverse reel, the angler will not be struck by a rotating spool handle. With an anti-reverse reel, the angler can grasp the spool handle and start to reel in or apply pressure to the line even when the line is still paying out at high speed. In the DXR anti-reverse reel, the drag adjustment knob is on the same side of the reel as the spool handle.

The drag feature of both the reel described in the '508 patent and the DXR anti-reverse reel are important to the operation of the reel. The drag on both reels is adjustable. One can set the drag to a light setting in which the friction of the drag prevents overrun and tangling. Overrun can occur when the drag on a reel is set too lightly. If one is pulling line off the reel with no drag, the reel will keep tuning after one stops pulling line. Several of the coils of line on the reel may loosen-up and possibly overlap one another becoming tangled. Then, when it is attempted to remove more line, either by the fisherman pulling with his hand or by the fish trying to run, the tangled coil prevents line pay-out. Line cannot be paid out until tangled coils are untangled and cleared. This can result in a lost fish. Therefore, setting the drag properly is important.

The drag is also useful when fighting a larger fish. The drag setting can be increased thereby increasing the friction between the rotating spool and the reel frame. This requires more effort by the fish to swim away from the angler. However, if the drag setting is too high, too much force is applied to the line and the fish may break the line and escape. If the drag setting is too low, the fish is not sufficiently impeded and may run with the entire length of the line and backing, also, possibly resulting in lost fish.

SUMMARY OF THE INVENTION

In accordance with the present invention, an anti-reverse large arbor fly fishing reel is provided having a spool retrieve handle not mounted directly on the spool and a drag adjustment on the side of the reel opposite the spool retrieve handle.

Still further in accordance with the invention, an anti-reverse large arbor fly fishing reel is provided having two large engaging annular friction surfaces, one mounted directly on the reel spool and the other mounted on a friction plate adapted to rotate in a selected direction only.

Still further in accordance with the present invention, an anti-reverse large arbor fly fishing reel is provided having a drag adjustment knob on the side of the reel opposite the spool handle, said drag adjustment knob adjusting the force urging the two drag annular surfaces into frictional engagement.

Still further in accordance with the present invention, a drag offset is provided adjacent set drag adjustment knob, set drag offset adapted to switch between an increased drag position and a decreased drag position.

Yet further in accordance with the invention, the drag offset is a disk position between the reel frame and the drag adjustment knob which has a first surface bearing against the drag offset knob and a second surface bearing against the reel frame which occupies a first axial distance in a low drag setting and a second greater axial distance in a high drag setting.

Still further in accordance with the invention, the drag offset disk is provided with low drag setting detentes and high drag setting detentes holding the drag offset disk in one of these two positions.

Yet further in accordance with the invention, the drag offset disk is provided with raceways engaging protuberances on the reel frame said raceways connecting the low drag detente position and the high drag detente position.

Yet further in accordance with the invention, the protuberances on the wheel frame are balls adapted to slidably engage the raceways on the drag offset disk and semi-fixably engage the detente recesses on the drag offset disk.

Yet further in accordance with the invention, the drag offset disk is provided with a gripping surface allowing an angler to easily move the drag offset disk from the low drag position to the high drag position.

Still further in accordance with the present invention, the drag offset disk gripping surface is either a knurled outer surface, a protrusion, or a number of protrusions spaced around the disk.

The primary object of the present invention is to provide an anti-reverse large arbor fly fishing reel which is robust in design, suitable for use in challenging environments such as saltwater flats, and has a drag system which is easily adjustable by the angler.

It is another object of the present invention to provide an anti-reverse fly fishing reel in which the drag adjustment knob is on the side of the reel opposite from the spool rotating handle.

It is still another object of the present invention to provide a fly fishing reel having an adjustable drag which also has a second separate drag offset adjustment or switch.

It is still another object of the present invention to provide a fly fishing reel in which an adjustable drag is provided with a drag offset adjustment having detentes retaining the drag offset in a light drag offset position or a heavy drag offset position.

It is still another object of the present invention to provide an anti-reverse large arbor fly fishing reel having an improved drag and improved reel control and operation.

These and other objects of the present invention will become apparent from the following description of preferred embodiments of the invention taken together with the accompanying drawings.

BRIEF DESCRIPTION OF THE DRAWINGS

The invention may take physical form in certain parts and arrangements of parts, preferred embodiments which will be described in detail and which are illustrated in the accompanying drawings which form a part hereof and wherein:

FIG. 5 is a perspective view of the drag offset disk used in the reel shown in FIGS. 1–4;

FIG. 5A is a plan view of the drag offset disk seen in FIG. 5 showing the side of the disk facing the drag adjustment knob;

FIG. 5B is a plan view of the side of the drag offset disk opposite the side shown in FIG. 5A;

FIG. 5C is a cross-sectional view of the drag offset disk taken along line C—C in FIG. 5B;

DESCRIPTION OF THE PREFERRED EMBODIMENTS

Figure 1:
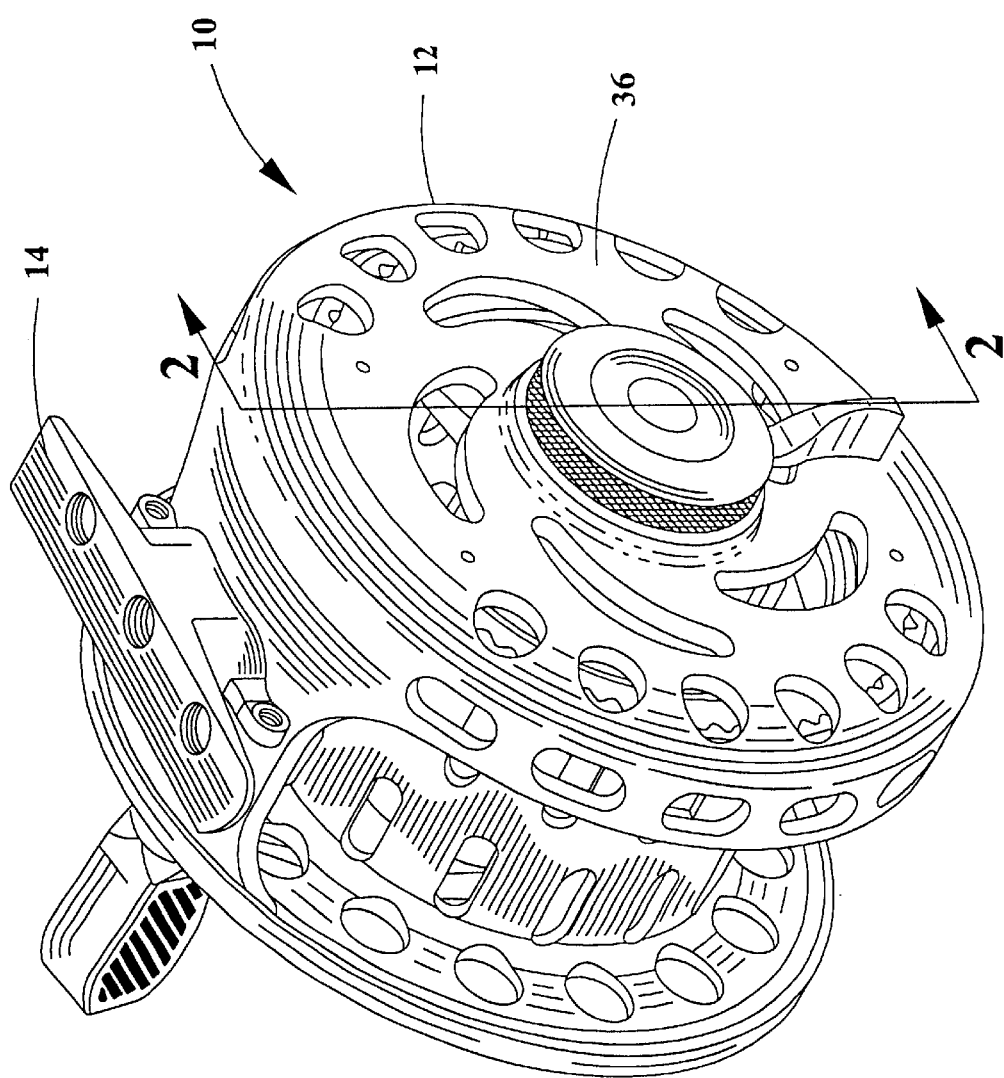
FIG. 1 is a perspective view of an anti-reverse large arbor fly fishing reel in accordance with a first embodiment of the invention showing the spool rotating handle on the left and the drag offset actuator on the right.

Referring now to the drawings wherein the showings are for the purpose of illustrating preferred embodiments of the invention only and not for the purpose of limiting same, FIG. 1 shows an anti-reverse large arbor fly fishing reel 10 in accordance with the present invention. The reel 10 comprises several parts and subassemblies including a frame 12, a foot 14, a friction plate assembly 16, the handle assembly 18, a drag knob assembly 20, and a spool 22. Many of the parts and assemblies of the reel 10 rotate around a central axis 30. In use, the frame 12 does not rotate. A hollow frame shaft 32 has an enlarged base 34 which is fixed to the frame side wall 36 by means of machine screws or the like (not shown). The frame side wall 36 is generally disk shaped with a top axial extension 36a and a bottom axial extension 36b. The foot 14 is fixed to the top axial extension 36a as is conventional.

The frame shaft 32 has a cylindrical outer surface. A hollow friction plate shaft 38 surrounds the frame shaft 32 over a substantial portion of the blank. The friction plate shaft 38 has an enlarged base which is fixed to a friction plate 42. The friction plate 42 serves multiple functions and is sometimes referred to as a ratchet plate. As can be best seen in FIG. 2, the friction plate 42 is generally disk shaped extending radially outwardly from the axis 30 of the reel. The friction plate 42 has an annular ratchet flange 44 extending toward the frame side wall 36. The ratchet flange 44 has an inner surface with a sawtooth surface 48. Spring loaded ratchet pawls 46 are fixed to the frame 12 and engage the sawtooth surface 48 on the flange 44 allowing the friction plate 42 to rotate in one direction only with respect to the frame 12. The structure and operation of the ratchet flange 44 and ratchet pawls 46 are substantially the same as used and described in Lepage 6,155,508 and will not be further described herein. The ratchet mechanism is switchable. In one position, the friction plate assembly 16 (the friction plate 42 and the friction plate shaft 38) can rotate clockwise and only clockwise with respect to the frame 12. In the second position, the friction plate assembly 16 can rotate counterclockwise and only counterclockwise with respect to the frame 12.

The friction plate shaft 38 is cylindrical over most of its length starting from the enlarged base 40. The portion of the friction plate shaft remote from the base 40 has four flat sides giving it a generally rectangular cross-section with rounded corners. A handle arm 50 forming part of the handle assembly 18 has a central aperture with a cross-section identical to the external cross-section of the end of the friction plate shaft 38. The handle arm 50 is mounted on the friction plate shaft 38 and therefore rotationally fixed to the friction plate shaft 38 and can rotate with and only with the friction plate shaft 38. The handle plate aperture has an enlarged portion accommodating a ball bearing 52. The ball bearing 52 bears against the handle shaft 50 and also against frame shaft 32. Similarly, a ball bearing 54 is positioned between the end of the frame shaft 32 closest to the frame side wall and the friction plate 42. Thus, the friction plate assembly 16 is rotatably supported with respect to the frame shaft 32 on ball bearings 52, 54 for smooth rotation in the selected direction.

The handle assembly 18 comprises the handle arm 50, a spool handle knob 56 and a spool handle knob axle 58.

The spool 22 is comprised of an inner spool cylinder 60 an outer spool cylinder 62, a spool web 64, a first spool side wall 66, and a second spool side wall 68. The inner spool cylinder 60 is supported on two ball bearings 70, 72 which engage the inner spool cylinder 60 and the cylindrical portion of the friction plate shaft 38. The spool web 64 is robust and rigidly supports the remaining elements of the spool on the inner spool cylinder 60. The spool side wall 66, 68 and outer spool cylinder 62 form a cylindrical trough which will carry a fly line for use in fly fishing.

The surface of the first spool side wall 66 facing the frame 12 supports an annular body of friction material 74. This annular body is also sometimes referred to as the first (or spool) drag surface. The spool drag surface 74 engages a second annular body of friction material 76 which bears against the first body of friction material 74. The first body of friction material 74 is permanently bound to the spool by means of adhesive or the like. The second body of friction material 76 is permanently bound to the ratchet plate 42 by adhesive or the like. One of the bodies of friction material is a composite. The other body is Rulon brand PTFE as is conventional in drag design.

The spool 22 also contains a clicker pawl 78 containing a recess in the periphery of the first spool side wall 66. The clicker pawl engages teeth 80 evenly spaced around the entire periphery of the friction plate 42. The design and operation of the clicker pawl and teeth are substantially similar to similar structures and operation described and illustrated in Lepage 6,155,508.

From the above description, it can be seen that the spool 22 and friction plate assembly 16 can rotate as a unit in one direction. In this direction, the line in direction, the two friction material surfaces 74, 76 do not move with respect to one another and rotation of the spool 22 is relatively friction free. When the spool is rotated in the opposite direction, the ratchet pawls 46 engage the sawtooth surface 48 on the friction plate 42 preventing rotation of the friction plate assembly 16. The spool must therefore rotate with respect to the friction plate assembly 16 creating friction between the two friction material layers 74, 76 which adds drag to rotation in the line out direction. As the handle assembly 18 is fixed to the friction plate shaft 38, the handle assembly does not rotate in the line out direction. As described earlier, the line out direction can be either clockwise or counter-clockwise as selected by the user by placement of the pawls 46.

The amount of retarding torque exerted on the spool by the action of the two friction surfaces 74, 76 is adjustable with the drag knob assembly 20. A drag knob shaft 90 passes through the central aperture of the frame shaft 32 from one side of the reel to the other. A pin (not shown) is press fit into an alignment hole 92 and extends into mating slots (not shown) in the frame shaft 32. The slots extend axially along the frame shaft 32 allowing movement of the drag knob shaft 90 axially within the frame shaft 32 but preventing rotational movement. The drag knob shaft 90 has an enlarged head 94 resting and in recess in the drag knob 96. The drag knob 96 has a central bore which is coaxial with the reel axis 30 and surrounds the drag knob shaft 90. The drag knob 96 is threaded over a portion of the central bore. The drag knob shaft 90 has a threaded portion 98 engaging the threads on the drag knob 96. Therefore, when the knob 96 is rotated, the shaft 90 is moved axially.

The end of the drag knob shaft 90 remote from the drag knob 96 has a threaded bore 102 which accepts an arm cap screw 104. The cap screw 104 has an enlarged head with an inwardly facing shoulder which engages against the ball bearing 52 which in turn engages against the handle arm 50. The handle arm 50, as previously described, is slidably mounted upon the friction plate shaft 38. The handle arm 50 has an inwardly facing surface 110 which bears against a coil spring 112 contained within a spring holder 114. The spring holder 114 in turn bears against the ball bearing 70 which bears against a shoulder on the spool 22. This structure applies spring force from the spring 112 axially urging the spool 22 and the spool friction material surface 74 against the friction material surface 76 on the ratchet plate 42. By turning the drag knob 96 in a tightening direction, the drag knob shaft 90 is pulled toward the drag knob (to the right in FIG. 2). The drag knob shaft must move axially when the threads are turned as it cannot move radially due to the presence of the pin in the alignment hole 92. Moving the drag knob shaft 90 to the right pulls the handle arm 50 against the spring 112 compressing the spring and increasing the force exerted normally to the friction surfaces 74, 76. The drag or retarding torque exerted on the spool is thereby increased.

Figure 2:
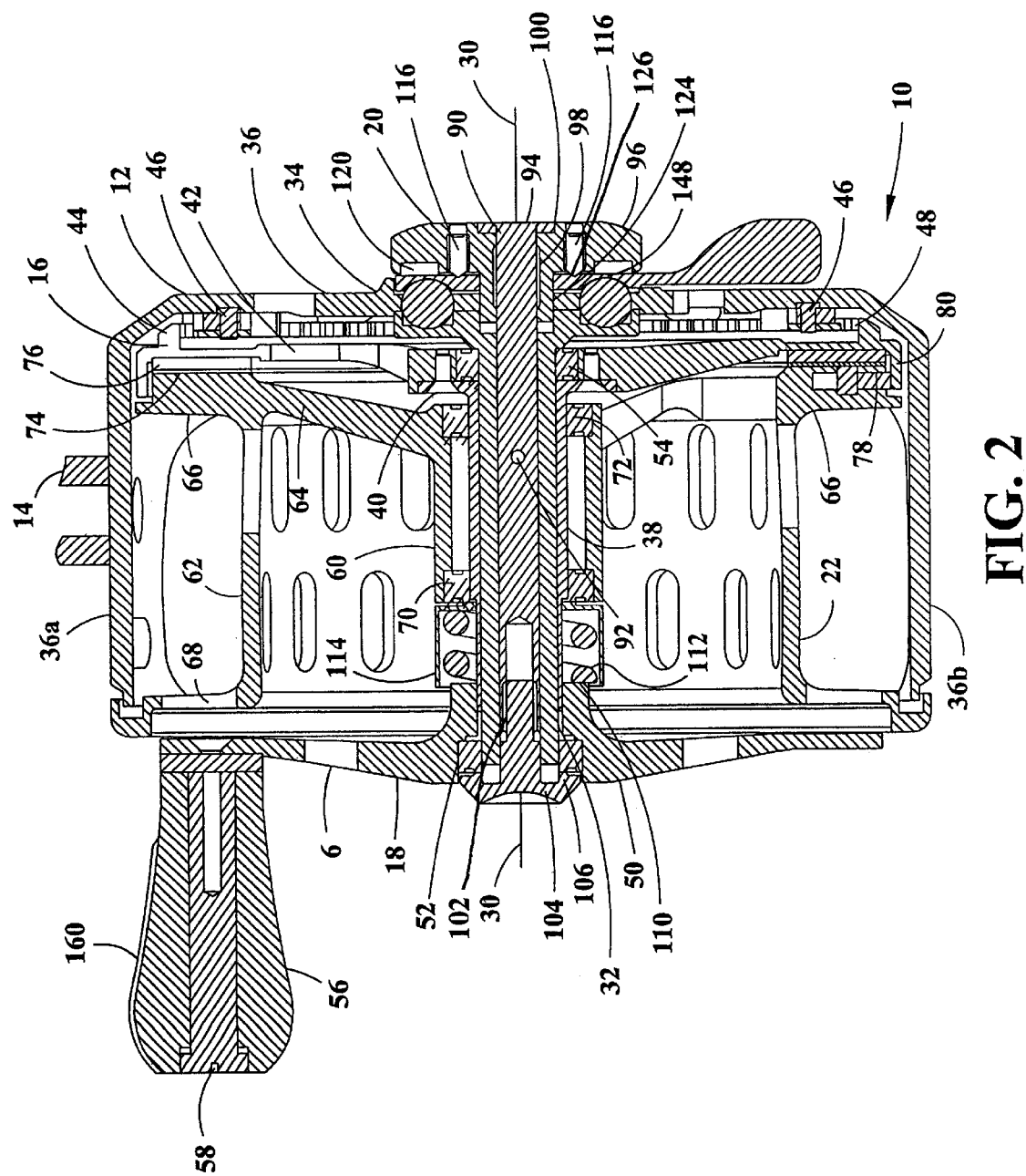
FIG. 2 is a cross-sectional view of the embodiment seen in FIG. 1 taken along Line 2—2 of FIG. 1.

As can be seen in FIG. 2, the drag knob 96 has an enlarged disk portion 100 and a cylindrical extension 124. The disk portion is provided with a number of spring-loaded detente posts 116. The detente posts engage selected ones of an array of dimples 126 arranged in a circle around the axis 30 on a drag offset disk 120.

The drag offset disk 120 is shown in more detail in FIGS. 5, 5A, 5B, and 5C. The drag offset disk 120 has a central aperture 122 through which the cylindrical extension 124 of the drag knob 96 passes. On the side of the drag offset disk 120 facing the drag knob disk portion 100, a plurality of dimples 126 are spaced around a circle coaxial with the axis of the reel. The dimples interact with the detente posts 116 described above.

The side of the drag offset disk 120 opposite the dimpled side, illustrated in FIG. 5A, has a number of grooves in its surface. Each groove 130 has a shallow dimple 132 at one end and a deeper dimple 134 at the other end. The grooves are sloped from a shallow portion near the shallow dimple 132 to a deeper and wider portion near the deeper dimple 134. The shallow end of the groove adjacent the shallow dimple 132 is somewhat less deep than the shallow deep dimple itself. Similarly, the groove 130 directly adjacent the deeper dimple 134 is somewhat less deep than the dimple 134 itself. On larger reels, four sets of grooves and dimples are spaced evenly around the drag offset disk 120. On smaller reels, three sets of grooves and dimples are spaced around the drag offset disk 120.

A pin 136 is press fit into a blind hole 138 near the central aperture of the drag offset disk 120. A drag offset handle 140 extends outwardly from the periphery of the disk portion of the drag offset disk 120.

Figure 6:
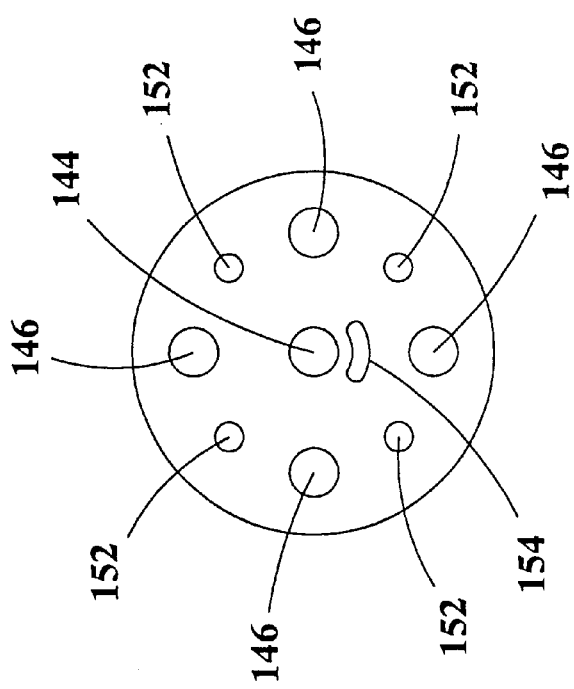
FIG. 6 is an enlarged plan view of the central portion of the reel frame which engages the drag offset disk.
Figure 9:
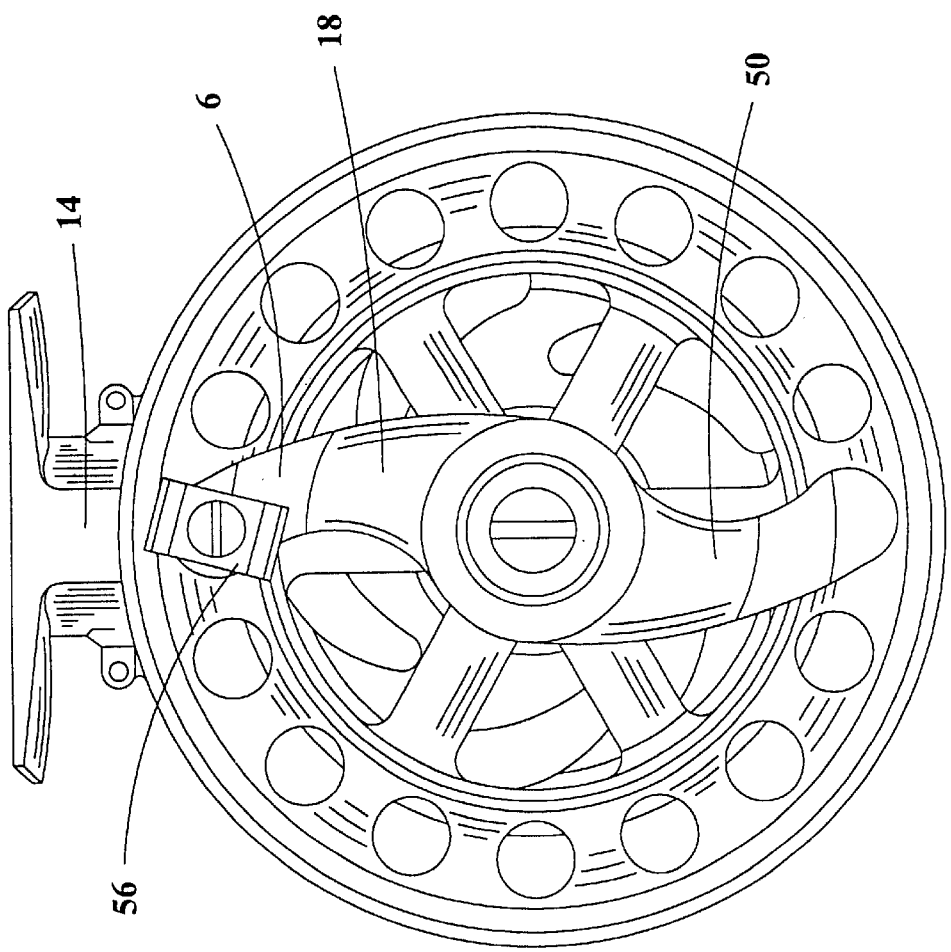
FIG. 9 shows the reel of FIGS. 1–6 from the spool handle side.

FIG. 6 shows an enlarged detail of the outwardly facing portion of the frame 12 directly adjacent the drag offset disk 120. The frame has an aperture 144 accommodating the drag knob extension 124 at its center. Surrounding the central aperture are four larger holes 146 which accommodate spheres 148 (FIG. 2). These holes are spaced 90° apart in larger reels. In smaller reels, only three holes are present, spaced 120° apart. Four smaller holes 152 are also evenly spaced around the center axis of the reel. The smaller holes 152 are threaded. Machine screws are used to fix the frame shaft 32 to the frame 12 using the four holes 152. An arcuate slot 154 penetrates through the frame wall close to the central aperture 144. The slot accommodates the pin 136 held in the blind hole 138 when the drag offset disk 120 is assembled onto the reel. The length of the slot is selected to limit the rotation of the drag offset 120 so that the disk can move between a position where the spheres 148 engage the shallow dimples 132 on the one extreme and the deeper dimples 134 at the other extreme. Thus, on a larger reel with four races, the center point of the shallow dimple is spaced from the center point of the deeper dimple a radial distance of 60°. The slot 154 is sized to allow 58° motion of the pin 136 providing two positive stops with the spheres 148 just engaging the dimples at either end of the grooves 130. Of course a different slot length would be selected if different length grooves were selected.

Figure 3:
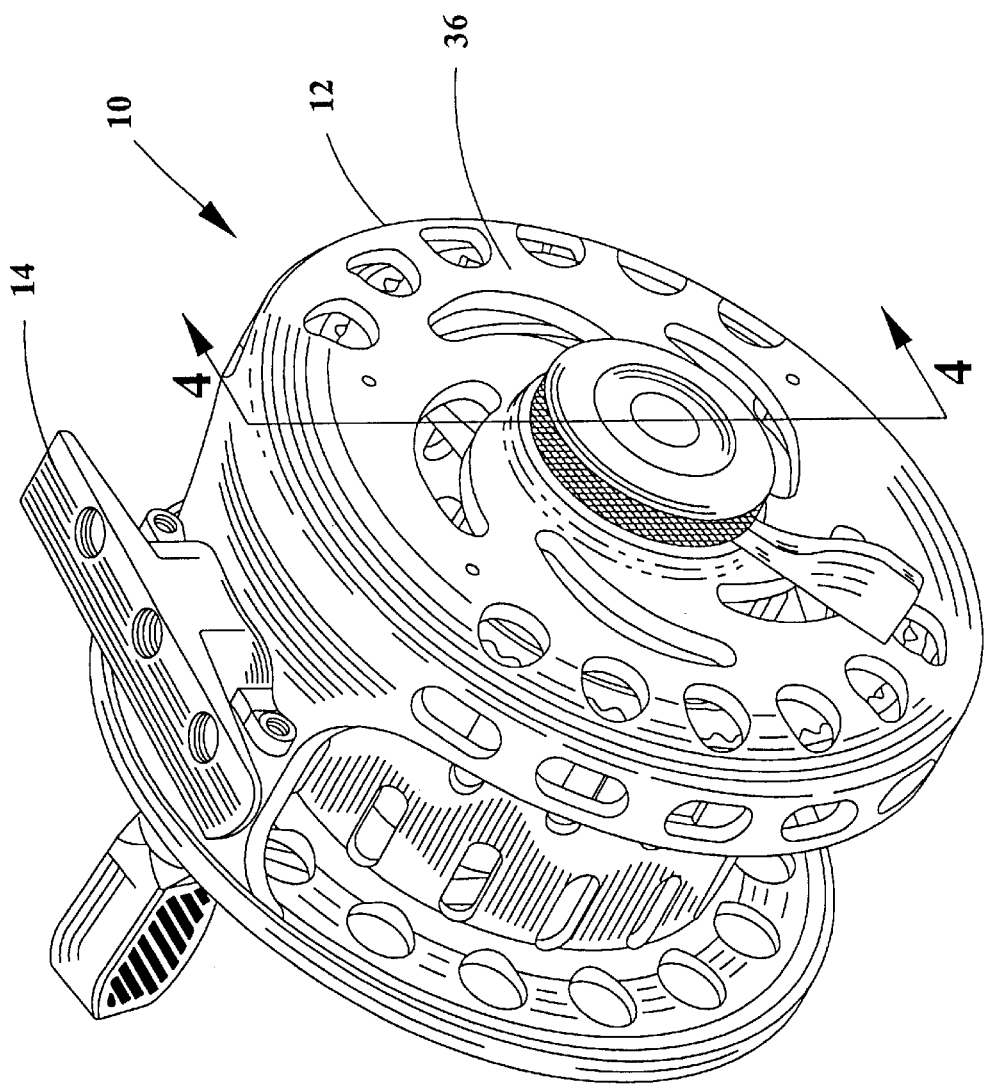
FIG. 3 is a perspective view of the reel seen in FIG. 1 with the drag offset mechanism in a second position.
Figure 4:
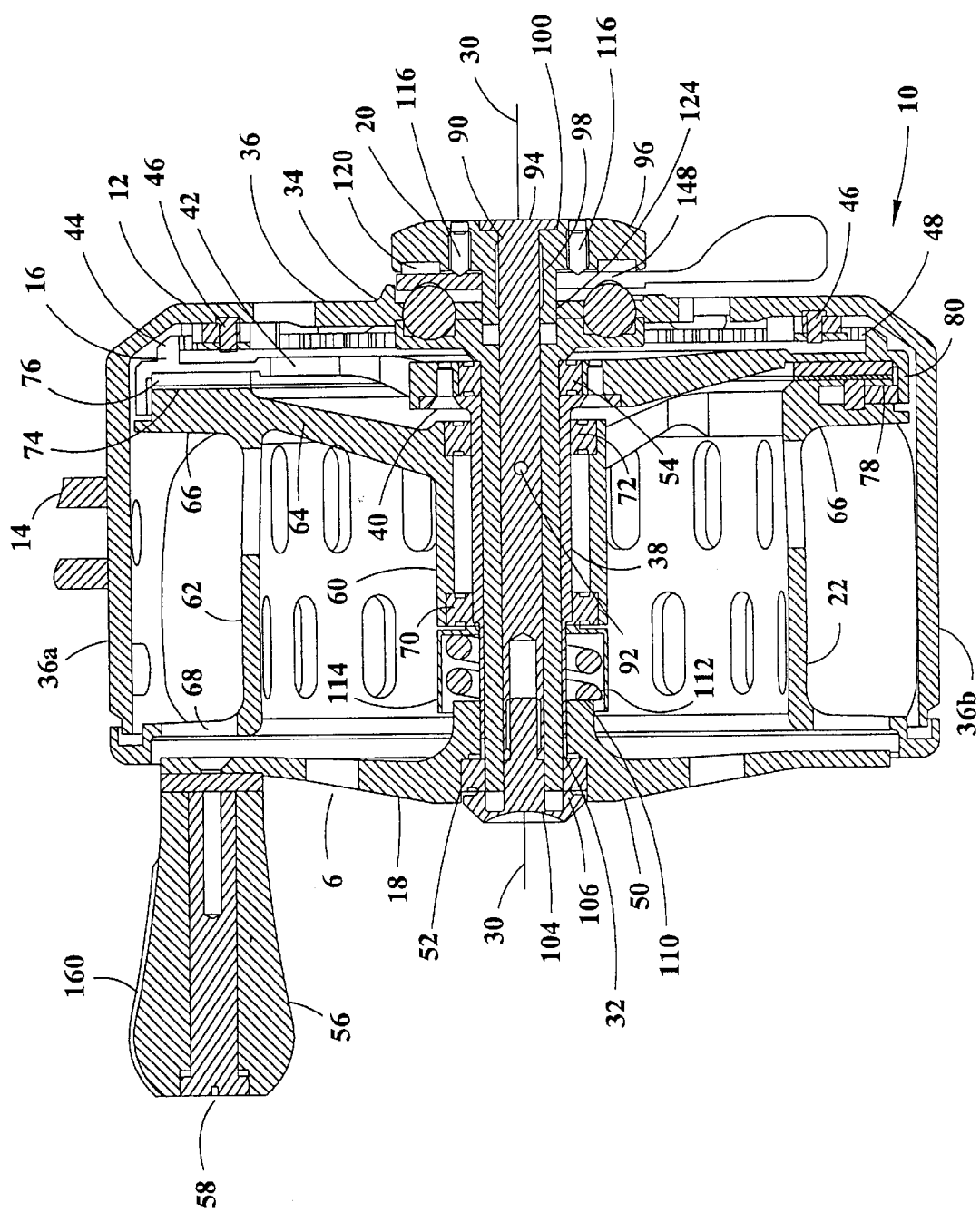
FIG. 4 is a cross-section of the reel of FIG. 3 also showing the drag offset mechanism in the second position.

A comparison of FIGS. 2 and 4 illustrates the operation of the drag offset disk 120 and the reel in general. Looking first at FIG. 2, one sees the reel 10 with the drag offset disk 120 in the light drag position. The drag knob 96 is turned until the appropriate light drag is achieved. Often a fisherman will select a drag sufficient to prevent overrun only which allows line to be easily taken off the reel but prevents the reel from continuing to spin after tension is removed. In this configuration, a light spring pressure is exerted by the spring 112 against the spool 22. Line may be removed by the angler by simply pulling on the line causing the spool 22 to spin with respect to the frame 12. The friction plate assembly 16 does not spin as line is removed. Therefore, the handle assembly 118 including the retrieve handle 160 remains stationary. Line may be easily removed from the spool by the fisherman and may be easily retrieved by simply grasping the retrieve handle 160 and rotating in the only possible direction pulling in line. In the line in direction, the handle arm 50, friction plate assembly 16, and spool 22 rotate as a unit. The drag is therefore not engaged and no resistance to rotation is created. This configuration is often used when an angler is casting to fish. The angler can easily pay out or retrieve line to cast a fly to the appropriate location. When a fish takes the fly, an angler will wish to apply more drag but not too much more drag. This is accomplished with the present invention by moving the drag offset disk 120 from the light drag position seen in FIGS. 1 and 2 to the heavy drag position seen in FIGS. 3 and 4. The handle 140 is pushed from one stop to the other as seen in FIG. 3 causing the disk to rotate an appropriate amount, in the illustrated embodiment, 60°. The spheres 148 which were previously engaged in the deeper dimples 134 are now engaged in the shallow dimples 132. The drag knob 96 is pushed away from the frame 12 which in turn draws the handle arm 50 inwardly compressing the spring 112. A predetermined increase in spring force is thereby applied to the spool and the normal force applied to the two friction material surfaces 74, 76 is increased. Drag torque resistance is increased to a fighting drag level.

The amount of drag resistance increase is preset by selecting an appropriate difference in depth of the shallow dimples 132 when compared to the deeper dimples 134. This distance is directly translatable into an increased in spring compression and spring force exerted on the spool. The normal compressive force to the friction surfaces is increased a preset amount in a predictable way.

The angler can also preset a desired fighting drag by adjusting the knob 96 when the drag offset disk 120 is in the heavy drag position seen in FIGS. 3 and 4. After presetting the desired fighting drag, the angler simply switches to the light drag configuration seen in FIGS. 1 and 2 providing a significantly lighter drag usable while casting.

Figure 7:
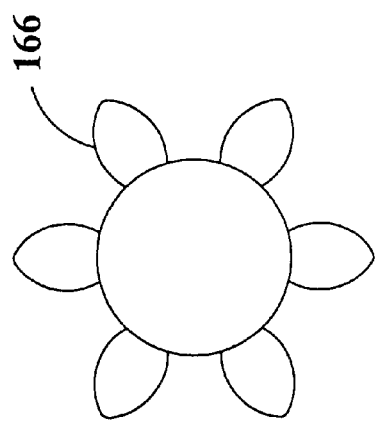
FIG. 7 shows an alternate embodiment of the invention using a different drag offset disk.
Figure 8:
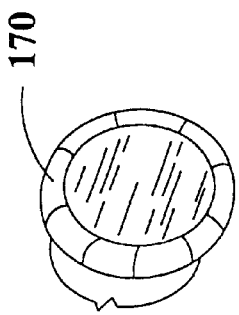
FIG. 8 shows another drag offset disk.

FIG. 7 illustrates an alternative embodiment for the drag offset disk 120. Rather than having a single handle 140, a star-shaped disk is used having several outwardly extending tabs 166 regularly spaced around the periphery of the disk 120. All other operative portions of the disk remain identical. FIG. 8 shows another variation of the drag offset disk 120 in which the circumference of the disk is enlarged and an upstanding rim is provided around its periphery. The rim 170 is textured on its outer surface to provide easy gripping. The advantage of this design is ease of adjusting between the light and heavy drag set and a lack of protuberances which can tangle line.

The above-described reel provides an anti-reverse large arbor reel suitable for use in the saltwater environment with a very smooth and versatile drag mechanism. The controls for the reel with two drag adjustments on one side and an anti-reverse retrieve handle on the other provide ease of use. These advantages and others are provided by the structures described above. While the invention has been described with reference to preferred embodiments, obviously, modifications and alterations to these structures will occur to others upon the reading and understanding of this specification. It is intended to include all such modifications and alterations insofar as to come within the scope of the appended claims or the equivalence thereof.

Having thus described the invention, it is claimed:

1. An anti-reverse fly fishing reel comprising:
   a foot adapted to mount said reel on a fishing rod;
   a frame attached to said foot;
   a spindle assembly having an axis said spindle assembly being attached to said frame;
   a spool surrounding at least a portion of said spindle assembly;
   a handle engaging said spindle assembly;
   said spindle assembly adapted to allow rotation of said handle in a first direction only; and,
   a drag assembly adapted to adjust the frictional resistance to rotation of said spool in a second direction, said drag assembly including a drag knob said drag knob disposed on said reel on the side opposite said handle.

2. The reel of claim 1, wherein said spool has a side surface and a first annular friction surface on said side surface and said reel further comprises a friction plate adapted to rotate about said spindle axis in a selected direction, said friction plate having a second annular friction surface engaging said first annular friction surface.

3. The reel of claim 2, wherein said drag assembly is adapted to urge said friction surfaces into more forceful engagement when said drag knob is rotated in a selected direction.

4. The reel of claim 3, wherein said drag knob is threadably engaged to a drag knob shaft which engages against a spring which urges said spool against said friction plate whereby rotating said drag knob adjusts the spring force acting on said friction surfaces.

5. The reel of claim 4 wherein said drag knob shaft engage an arm cap screw which in turn engages said handle which engages said spring.

6. The reel of claim 4 further comprising a drag offset means adapted to adjust said drag between an increased drag force and a decreased drag force.

7. The reel of claim 4 further comprising a drag offset disk positioned between said drag knob and said frame, said drag offset disk rotatable independently of said drag knob between a first position in which said drag applies a selected low drag and a second position in which said drag applies a selected higher drag.

8. The reel of claim 7, wherein said drag offset disk holds said drag knob a first axial distance away from said frame in said first position and a second axial distance away from said frame in said second position, said second axial distance being greater than said first axial distance.

9. The reel of claim 8, wherein said reel includes detente means releasably retaining said drag offset disk in said first position and said second position.

10. An anti-reverse fly fishing reel comprising:
    a foot adapted to mount said reel on a fishing rod;
    a frame attached to said foot;
    a spindle assembly having an axis said spindle assembly being attached to said frame;

a spool having a side surface and a first annular friction surface on said side surface, said spool surrounding at least a portion of said spindle assembly;

a friction plate adapted to rotate about said spindle axis in a selected direction, said friction plate having a second annular friction surface engaging said first annular friction surface;

a handle engaging said spindle assembly;

said spindle assembly adapted to allow rotation of said handle in a first direction only;

a drag assembly adapted to adjust the frictional resistance to rotation of said spool in a second direction, said drag assembly including a drag knob said drag knob disposed on said reel on the side opposite said handle;

said drag knob being threadably engaged to a drag knob shaft which engages against a spring which urges said spool against said friction plate whereby rotating said drag knob adjusts the spring force acting on said friction surfaces;

said drag assembly being adapted to urge said friction surfaces into more forceful engagement when said drag knob is rotated in a selected direction;

a drag offset disk positioned between said drag knob and said frame, said drag offset disk rotatable between a first position in which said drag offset disk holds said drag knob a first axial distance away from said frame and said drag applies a selected low drag and a second position in which said drag offset disk holds said drag knob second axial distance away from said frame and said drag applies a selected higher drag; said second axial distance being greater than said first axial distance; and, detente means releasably retaining said drag offset disk in said first position and said second position, said detente means comprising said drag offset disk having a plurality of grooves engaging protuberance on said frame said grooves each connecting a first position detente recess and a second position detente recess, said first position recesses being deeper than said second position recesses.

11. The reel of claim 10, wherein said protuberances are balls contained in apertures in said frame.

12. The reel of claim 7, wherein said drag offset disk has a gripping surface allowing manual movement of said disk between said first and second positions.

13. The reel of claim 12, wherein said gripping surface is a protrusion extending radially from said disk.

14. The reel of claim 12, wherein said gripping surface is a plurality of protrusions extending from the periphery of said disk.

15. A fly fishing reel comprising:

a mounting foot for mounting said reel on a fishing rod;

a frame attached to said foot;

said frame includes a circular frame member generally symmetrical about a central axis and at least one flange member projecting perpendicularly in relation to said circular frame member;

said frame having a shaft assembly extending therefrom, said shaft assembly comprising an outer friction plate shaft, a frame shaft passing through said friction plate shaft, said frame shaft fixed to said frame, a drag knob spindle axially moveable within said frame shaft, said drag knob spindle threadingly engaged to a drag knob;

a crank assembly having a crank arm with a sleeve extending therefrom, said sleeve having a hollow core adapted to be mounted on said friction plate shaft;

a ratchet disk fixed to said friction plate shaft selectively allowing said crank assembly to rotate in one direction only with respect to said frame;

a spool adapted to be rotatably and detachably mounted on said friction plate shaft, said spool being rotatable in both directions;

said drag knob being rotatably adjustable to apply increasing force against a friction surface on said ratchet disk that engages said spool as said drag knob is screwed towards said spool; and, a drag offset disk mounted on said drag knob spindle and disposed between said drag knob and said circular frame member for selecting a first drag setting or a second drag setting.

16. A fly fishing reel comprising:

a mounting foot for mounting said reel on a fishing rod;

a frame attached to said foot;

said frame including a circular frame member generally symmetrical about a central axis and at least one flange member projecting perpendicularly in relation to said circular frame member;

said frame having a shaft assembly extending therefrom, said shaft assembly comprising an outer friction plate shaft a frame shaft passing through said friction plate shaft, a drag knob spindle axially moveable within said frame shaft;

a crank assembly having a crank arm with a sleeve extending therefrom;

a spool adapted to be rotatably and detachably mounted on said friction plate shaft;

a drag offset disk mounted on said drag knob spindle; and, a drag knob mounted on said drag knob spindle to apply increasing force against a pressure disk that engages said spool as said drag knob is screwed towards said spool.

17. The fly fishing reel of claim 16, wherein said frame shaft is fixed to said frame.

18. The fly fishing reel of claim 16, wherein said drag knob spindle threadingly engages to said drag knob.

19. The fly fishing reel of claim 16, wherein said sleeve has a hollow core adapted to be rotatably mounted on said friction plate shaft.

20. The fly fishing reel of claim 16, wherein said reel has a ratchet disk selectively allowing said crank assembly to rotate in one direction only with respect to said frame.

21. The fly fishing reel of claim 16, wherein said spool is rotatable in both the clockwise and counterclockwise directions.

22. The fly fishing reel of claim 16, wherein said drag offset disk is disposed between said drag knob and said circular frame member.

23. The fly fishing reel of claim 16, wherein said drag offset disk is moveable for selecting a first drag setting or a second drag setting.

24. The fly fishing reel of claim 16, wherein said crank includes a handle extending therefrom for rotating said spool.

25. The fly fishing reel of claim 24, wherein said handle is on the side of the reel opposite from said drag knob.

26. The fly fishing reel of claim 24, wherein said handle is on the side of the reel opposite from said drag offset disk.

27. An anti-reverse, adjustable drag fly fishing reel being comprised of:

a reel frame with an axis extending therethrough;

a drag adjustment shaft extending through said reel frame coaxial with said axis and having a first end and a second end, and said first end being adjacent said reel frame;

a ratchet disk having a first friction surface, said ratchet disk being coaxial with said drag adjustment shaft and adjacent said reel frame such that said first friction surface faces away from said reel frame, and said ratchet disk being rotatable in only one direction;

a spool having a second friction surface, said spool being mounted coaxially with said drag adjustment shaft such that said second friction surface is adjacent said first friction surface, said spool being axially displaceable relative to said ratchet disk;

a handle support member extending transverse said drag adjustment shaft and including a first mounting hole and a second mounting hole, said first mounting hole being mounted coaxially with and axially retained adjacent said second end of said drag adjustment shaft;

a handle extending parallel with and being radially spaced from said drag adjustment shaft, said handle being rotatably attached to said handle support at said second mounting hole;

a spring compressively positioned between said handle support and said spool, and biasing said spool toward said ratchet disk;

a drag adjustment knob being mounted on and threadedly engaging said drag adjustment shaft between said first end and said reel frame; and, an offset member displaceable between a first and a second position, said offset member having a gripping portion and a disk portion, said disk portion having a first side, a second side, and a hole extending through said disk portion between said first side and said second side, said disk portion being mounted between said drag adjustment knob and said reel frame such that said hole extending through said disk portion is coaxial with said drag adjustment shaft and said first side is adjacent said drag adjustment knob and said second side is adjacent said reel frame, said second side including at least one incline surface, said at least one incline surface helically extending between a first plane and a second plane, said first plane corresponding to said first position and extending parallel with said second side of said disk portion, said second plane corresponding to said second position and being parallel with said first plane and spaced away from said first plane toward said drag adjustment knob, and said reel frame having at least one projection engaging said at least one incline surface and axially displacing said drag adjustment shaft as said grip portion of said offset member is rotated between said first and said second positions.

\* \* \* \* \*